US011179873B2

(12) United States Patent
Whatcott et al.

(10) Patent No.: US 11,179,873 B2
(45) Date of Patent: Nov. 23, 2021

(54) MOLD EXTRACTOR

(71) Applicant: Purple Innovation, LLC, Lehi, UT (US)

(72) Inventors: Russell B. Whatcott, Eagle Mountain, UT (US); Steve Bonney, Alpine, UT (US); Terry V. Pearce, Alpine, UT (US)

(73) Assignee: Purple Innovation, LLC, Lehi, UT (US)

( * ) Notice: Subject to any disclaimer, the term of this patent is extended or adjusted under 35 U.S.C. 154(b) by 0 days.

(21) Appl. No.: 16/883,732

(22) Filed: May 26, 2020

(65) Prior Publication Data
US 2020/0282616 A1    Sep. 10, 2020

Related U.S. Application Data

(63) Continuation of application No. 15/816,895, filed on Nov. 17, 2017, now Pat. No. 10,661,492.

(51) Int. Cl.
*B29C 45/40* (2006.01)
*B29C 45/42* (2006.01)
(Continued)

(52) U.S. Cl.
CPC ...... *B29C 45/4005* (2013.01); *B29C 37/0007* (2013.01); *B29C 45/1744* (2013.01);
(Continued)

(58) Field of Classification Search
CPC .............. B29C 45/556; B29C 45/4005; B29C 45/1744; B29C 2045/4073;
(Continued)

(56) References Cited

U.S. PATENT DOCUMENTS 3,127,167 A * 3/1964 Rabinow ................. B65H 3/10
271/95
3,784,261 A    1/1974 Potter et al.
(Continued)

FOREIGN PATENT DOCUMENTS

CN    102101373 A    6/2011
DE    3445159 A1    6/1986
(Continued)

OTHER PUBLICATIONS

International Preliminary Report on Patentability, International Application No. PCT/US2018/060701, dated May 19, 2020.
(Continued)

*Primary Examiner* — Xiao S Zhao
*Assistant Examiner* — Emmanuel S Luk
(74) *Attorney, Agent, or Firm* — Dentons Durham Jones Pinegar

(57) ABSTRACT

Extractor systems for extracting a flexible article of manufacture from a mold include an extraction roller, at least one track configured to support the extraction roller, and a trolley configured to carry the extraction roller from a first side of the mold toward a second, opposite side of the mold. Molding systems include a mold and an extractor system. Methods of extracting a flexible article of manufacture from a mold include separating a first platen and a second platen, positioning an extraction roller between the separated first and second platens, engaging the article of manufacture with a row of teeth positioned along the extraction roller, and rotating the extraction roller to wrap the article of manufacture about the extraction roller.

4 Claims, 4 Drawing Sheets

(51) Int. Cl.
    *B29C 37/00*         (2006.01)
    *B29C 45/17*         (2006.01)
    *B29L 31/00*         (2006.01)

(52) U.S. Cl.
    CPC .......... *B29C 45/42* (2013.01); *B29C 45/4225* (2013.01); *B29C 2045/4084* (2013.01); *B29L 2031/751* (2013.01)

(58) Field of Classification Search
    CPC ............ B29C 2045/4084; B29C 45/42; B29C 2045/4241; B29C 2045/4291; B29C 45/4225; B29C 37/0007; B29C 45/7626; B29C 2045/7633; B29C 2043/5069; B29C 41/44; B29C 41/42
    See application file for complete search history.

(56) References Cited

U.S. PATENT DOCUMENTS

| | | | |
|---|---|---|---|
| 4,124,352 | A | 11/1978 | Pasch |
| 4,205,950 | A | 6/1980 | Suss et al. |
| 4,369,284 | A | 1/1983 | Chen |
| 4,568,073 | A * | 2/1986 | VanHorne ................ B65H 3/48 271/11 |
| 4,666,145 | A * | 5/1987 | Blumle .................. B65H 5/226 271/108 |
| 5,000,654 | A | 3/1991 | Shiotani |
| 5,232,213 | A * | 8/1993 | Parsons .................. B65H 3/128 271/95 |
| 5,297,897 | A | 3/1994 | Venrooij et al. |
| 5,431,384 | A * | 7/1995 | Obermiller ............. B65H 3/10 271/11 |
| 5,609,714 | A * | 3/1997 | Whiteside ............... B41J 17/28 156/387 |
| 5,723,085 | A | 3/1998 | Abrams et al. |
| 5,951,936 | A | 9/1999 | Coxhead |
| 5,994,450 | A | 11/1999 | Pearce |
| 7,144,009 | B2 * | 12/2006 | Kim ..................... B65G 47/848 271/276 |
| 7,964,664 | B2 | 6/2011 | Pearce |
| 8,414,725 | B2 | 4/2013 | Cho |
| 8,434,748 | B1 | 5/2013 | Pearce et al. |
| 8,628,067 | B2 | 1/2014 | Pearce et al. |
| 8,919,750 | B2 | 12/2014 | Pearce et al. |
| 8,932,692 | B2 | 1/2015 | Pearce |
| 9,446,542 | B2 | 9/2016 | Whatcott et al. |
| 2003/0021862 | A1 | 1/2003 | Kroeger |
| 2004/0197432 | A1 | 10/2004 | Menard |
| 2006/0051452 | A1 | 3/2006 | Wolter et al. |
| 2007/0087077 | A1 | 4/2007 | Downard |
| 2011/0146894 | A1 | 6/2011 | Cho |
| 2012/0146262 | A1 | 6/2012 | Adams et al. |
| 2012/0273998 | A1 | 11/2012 | Minoura et al. |
| 2013/0106022 | A1 | 5/2013 | Gridley et al. |
| 2015/0072034 | A1 | 3/2015 | Mangia et al. |

FOREIGN PATENT DOCUMENTS

| | | |
|---|---|---|
| DE | 3712743 A1 | 11/1988 |
| WO | 9734759 A2 | 9/1997 |

OTHER PUBLICATIONS

USPTO as International Searching Authority, "International Search Report and Written Opinion," International Application No. PCT/US2018/060701, dated Jan. 31, 2019.
Chinese National Intellectual Property Adminsration, "First Office Action," Chinese Application No. 201810785825.7, dated Sep. 3, 2020.
IP Australia, "Examination Report No. 1," Australian Application No. 2018369536, dated Mar. 17, 2021.
Chinese National Intellectual Property Administration, "Notification of Granting Invention," Chinese Application No. 201810785825.7, dated Apr. 27, 2021.
Canadian Intellectual Property Office, "Examiner's Report," Canadian Application No. 3082817, dated Jun. 3, 2021.

* cited by examiner

MOLD EXTRACTOR

CROSS REFERENCE TO RELATED APPLICATION

This application is a continuation of U.S. patent application Ser. No. 15/816,895, filed on Nov. 17, 2017 and titled MOLDING SYSTEMS, MOLD EXTRACTOR SYSTEMS, AND RELATED METHODS ("the '895 Application"), which issued as U.S. Pat. No. 10,661,492 on May 26, 2020. The entire disclosure of the '895 Application is hereby incorporated herein.

TECHNICAL FIELD

Embodiments of the present disclosure relate to molding systems for forming flexible articles of manufacture, to extractor systems for removing flexible articles of manufacture from a mold, and to related methods.

RELATED ART

Thermoplastic molding systems generally employ a mold having a mold cavity therein, into which molten thermoplastic material is injected under pressure. The mold generally includes two or more mold pieces that define the mold cavity between the mold pieces when the mold pieces are adjoined to one another. The molding system generally includes two platens that support the mold pieces, respectively. One or both of the mold platens is movable, such that the mold may be closed to perform a molding cycle, and subsequently opened to allow removal of the molded part from the mold. As the molten thermoplastic material is injected under pressure, the thermoplastic material exerts pressure against the mold pieces that generates separating forces between the mold pieces. Therefore, the platens must apply counteracting closing force to the mold pieces to maintain the mold closed during the molding cycle. The closing force that the platens must apply to the mold increases with increasing size of the article being molded in the mold cavity. Thus, molding systems for molding relatively large articles of manufacture can be extremely large, and can require high hydraulic pressure and electric power for operation.

After a molded piece is formed within the mold cavity, the two platens are separated and the molded piece is removed. In the manufacture of large, flexible articles, the removal of the molded piece is often performed by manually grasping the molded piece and pulling the molded piece from the mold.

SUMMARY

In some embodiments, this disclosure includes extractor systems for extracting a flexible article of manufacture from a mold. The extractor systems may include an extraction roller, which includes a base member and a row of teeth extending along and protruding from the base member. The extractor systems also may include at least one track configured to support the extraction roller, a trolley configured to carry the extraction roller from a first side of the mold toward a second, opposite side of the mold along the at least one track, and a motor mounted on the trolley and configured to rotate the extraction roller relative to the trolley as the trolley carries the extraction roller from the first side of the mold toward the second, opposite side of the mold.

In some embodiments, this disclosure includes molding systems that may include a mold and an extractor system for extracting a flexible article of manufacture from the mold. The mold includes a first mold half carried by a first platen and a second mold half carried by a second platen, the first mold half and the second mold half defining a mold cavity therebetween for forming the flexible article of manufacture. The extractor system may include an extraction roller sized and configured for wrapping the flexible article of manufacture about the extraction roller, and a trolley carrying the extraction roller and configured for horizontal movement of the extraction roller between the first platen and the second platen.

In some embodiments, this disclosure includes methods of extracting a flexible article of manufacture from a mold. Such methods may include separating a first platen from a second platen of the mold after molding the flexible article of manufacture between the first platen and the second platen, positioning an extraction roller between the separated first platen and second platen, engaging the flexible article of manufacture with a row of teeth positioned along the extraction roller, and rotating the extraction roller while horizontally moving the extraction roller over the first platen to wrap the flexible article of manufacture about the extraction roller.

DETAILED DESCRIPTION

Figure 1:
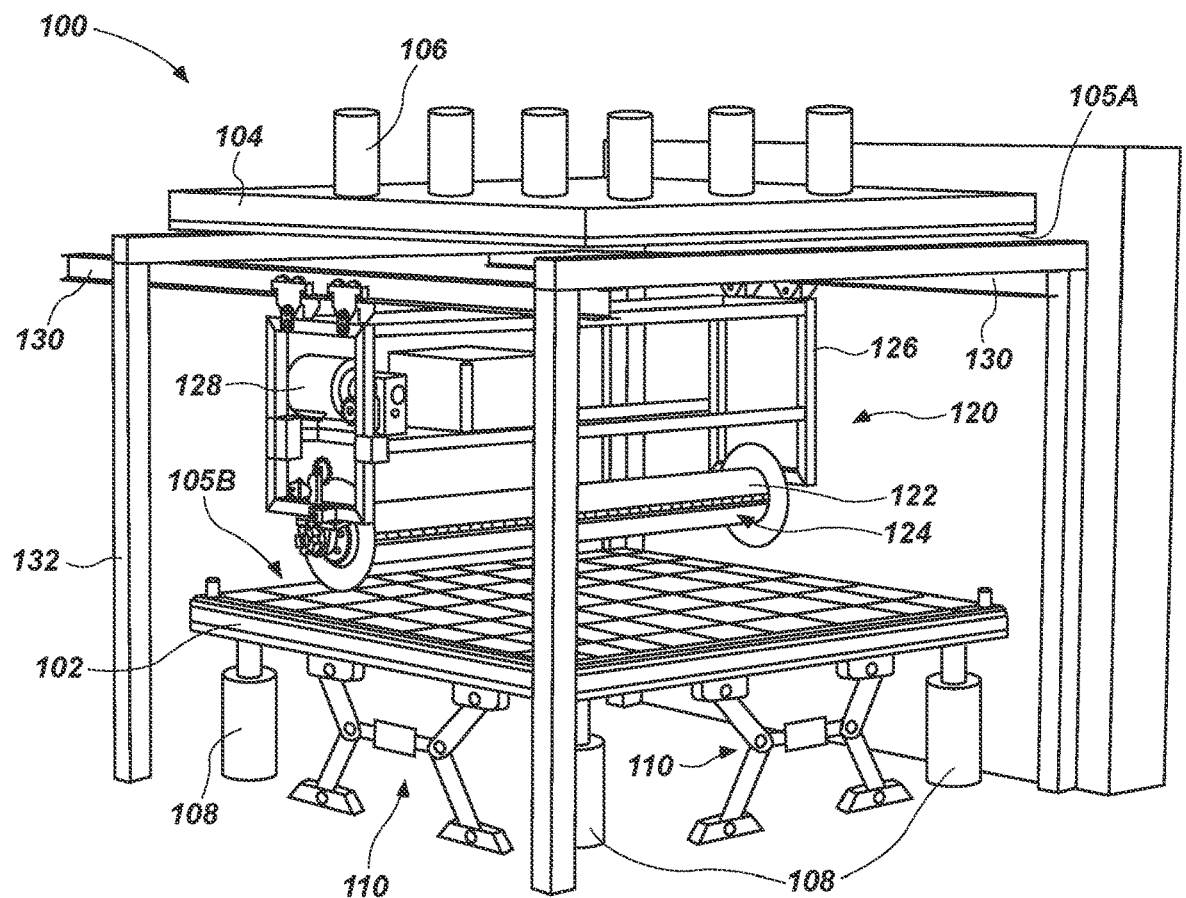
FIG. 1 is a perspective view of an embodiment of a molding system including an extractor system, according to the present disclosure.

The following description provides specific details in order to provide a thorough description of embodiments of the present disclosure. However, a person of ordinary skill in the art will understand that the embodiments of the present disclosure may be practiced without employing these specific details. Indeed, the embodiments of the present disclosure may be practiced in conjunction with conventional techniques and materials employed in the industry.

In the following detailed description, reference is made to the accompanying drawings, which form a part hereof, and in which is shown, by way of illustration, specific embodiments in which the present disclosure may be practiced. These embodiments are described in sufficient detail to enable a person of ordinary skill in the art to practice the present disclosure. However, other embodiments may be utilized, and changes may be made without departing from the scope of the disclosure. The illustrations presented herein are not meant to be actual views of any particular system, device, structure, or process, but are idealized representations that are employed to describe the embodiments of the present disclosure. The drawings presented herein are not necessarily drawn to scale. The drawings may use like reference numerals to identify like elements.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, any relational term, such as "first," "second," "over," "under," "clockwise," "counterclockwise," "left," "right," etc., is used for clarity and convenience in understanding the disclosure and accompanying drawings and does not connote or depend on any specific preference, orientation, or order, except where the context clearly indicates otherwise.

The embodiments of the present disclosure include molding systems and related extractor systems for extracting a flexible article of manufacture from a mold. The extractor systems include an extraction roller with a row of teeth for engaging the article of manufacture. The extraction roller may be carried by a trolley. A motor may be operatively coupled to the extraction roller to drive rotation of the extraction roller. In use, the article of manufacture formed in a mold may be coupled to the extraction roller by engaging with the row of teeth on the extraction roller, and the extraction roller may be rotated and moved along the trolley to wrap the article of manufacture about the extraction roller, thereby extracting the article of manufacture from the mold.

An embodiment of a molding system 100 is shown in FIG. 1. The molding system 100 includes a first platen 102 and a second platen 104 respectively supporting a first mold half 105A and a second mold half 105B (collectively referred to as mold 105) defining a mold cavity therebetween. Injection heads 106 may be positioned over the first platen 102, for injecting material (e.g., a thermoplastic material) into the mold cavity to form an article of manufacture. Linear actuators 108 and/or other similar mechanisms (e.g., toggle clamps 110, lead screws, etc.) may be positioned under the second platen 104 (and/or over the first platen 102) for moving the second platen 104 and the first platen 102 (and molds 105) toward each other at the beginning of a molding operation, for holding the molds 105 against each other during injection of material into the mold cavity, and for separating the second platen 104 and the first platen 102 (and molds 105) from each other after an article of manufacture is formed within the mold cavity.

The molding system 100 may include features (e.g., the platens 102 and 104, the linear actuators 108, the toggle clamps 110, the injection heads 106, the molds 105, etc.) that are the same as or similar to those described in U.S. Pat. No. 9,446,542, titled "Small Footprint Apparatus, Method, And Tooling for Molding Large Thermoplastic Parts," issued Sep. 20, 2016, the entire disclosure of which is incorporated herein in its entirety.

The molding system 100 may further include an extractor system 120 for extracting a flexible article of manufacture from the second mold half 105B. The extractor system 120 may include an extraction roller 122 having at least one row of teeth 124 protruding from an exterior surface of the extraction roller 122. The extraction roller 122 may be rotatably mounted on and carried by a trolley 126. A motor 128 may be operatively connected to and configured to rotate the extraction roller 122. The motor 128 may also be mounted on and carried by the trolley 126. The trolley 126 may be horizontally moveable along at least one track 130. The at least one track 130 and the trolley 126 may be supported by an extractor support frame 132.

The at least one track 130 may extend laterally beyond at least one side (e.g., the back left side from the perspective of FIG. 1) of the platens 102, 104 to provide a location that is not directly between the platens 102, 104 where the trolley 126 and the elements carried by the trolley 126 can be positioned when the platens 102, 104 are to be brought together for a molding operation. Portions of the at least one track 130 and extractor support frame 132 may be positioned sufficiently distant from each other to provide a space through which one or both of the first platen 102 and second platen 104 can vertically move during a molding operation. Thus, the first mold half 105A and second mold half 105B may be vertically moved toward each other during a molding operation without physical interference by the trolley 126, the at least one track 130, or the extractor support frame 132.

Figure 2A:
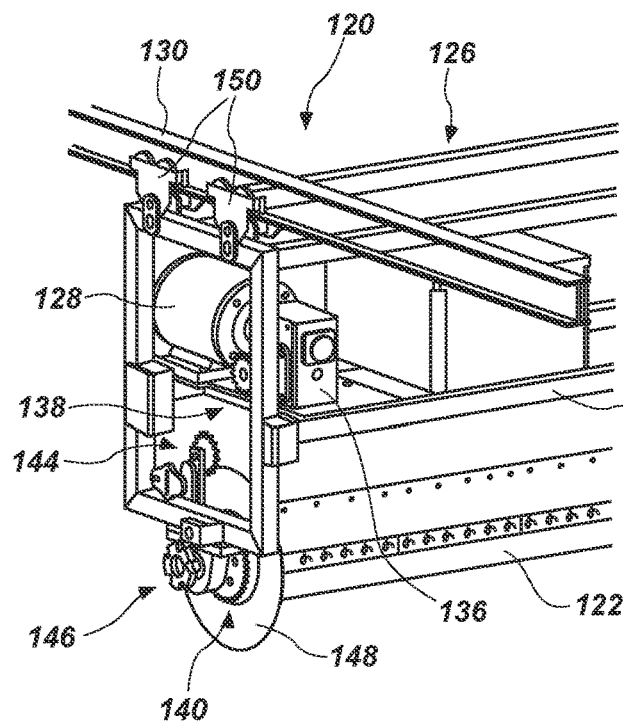
FIGS. 2A and 2B are perspective and side views, respectively, of a portion of the extractor system of FIG. 1.
Figure 2B:
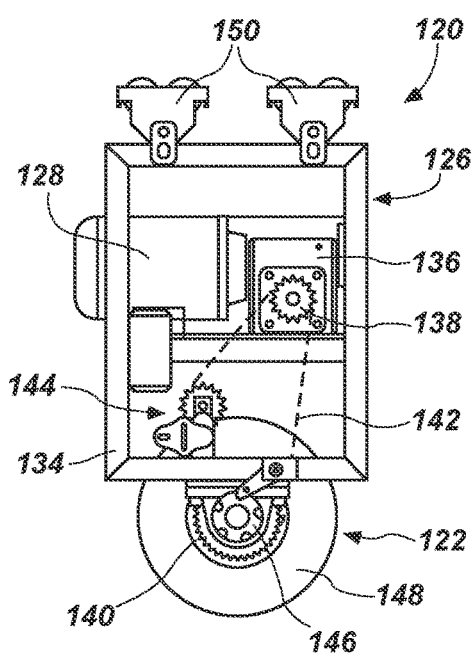

Referring to FIGS. 2A and 2B, detailed views of the extractor system 120 are shown. The extraction roller 122 and the motor 128 may be mounted on a trolley frame 134. In some embodiments, as shown in FIGS. 2A and 2B, the motor 128 may be positioned vertically over the extraction roller 122. The motor 128 may be positioned a sufficient distance from the extraction roller 122 to provide a space within which an article of manufacture may be positioned when wrapped about the extraction roller 122. The motor 128 may be operatively coupled to the extraction roller 122 for rotating the extraction roller 122. For example, the motor 128 may be configured to rotate a drive shaft within a gear box 136, which may rotate a drive gear 138. The drive gear 138 may be coupled to a roller gear 140, either directly by engagement of gear teeth or indirectly by an elongated drive member 142 (e.g., a chain, cord, or belt; shown in dashed lines in FIG. 2B; not shown in FIG. 2A). In some embodiments employing the elongated drive member 142, a tensioner 144 may also be operatively coupled to the elongated drive member 142 to facilitate proper tensioning of the elongated drive member 142.

In some embodiments, the gear box 136, elongated drive member 142, and tensioner 144 may be absent and the motor 128 may be positioned and oriented to directly drive the drive gear 138. In further embodiments, the motor 128 may be positioned proximate a longitudinal end of the extraction roller 122, and may be configured and connected to directly rotate the extraction roller 122 without any external gears.

A ratchet mechanism 146 may be coupled to the extraction roller 122 to allow rotation of the extraction roller 122 in one direction (e.g., counterclockwise from the perspective of FIG. 2B), but inhibition of rotation in an opposite direction (e.g., clockwise from the perspective of FIG. 2B) when the ratchet mechanism 146 is engaged. A flange 148 may be positioned at each longitudinal end of the extraction roller 122 for maintaining an article of manufacture on the extraction roller 122 and to avoid interference of the article of manufacture with other elements of the extractor system 120.

The trolley 126 and the elements carried by the trolley 126 may be coupled to the at least one track 130 by, for example, at least one trolley support roller 150. The at least one trolley support roller 150 may be configured and positioned to roll the trolley 126 horizontally along the at least one track 130.

Figure 3:
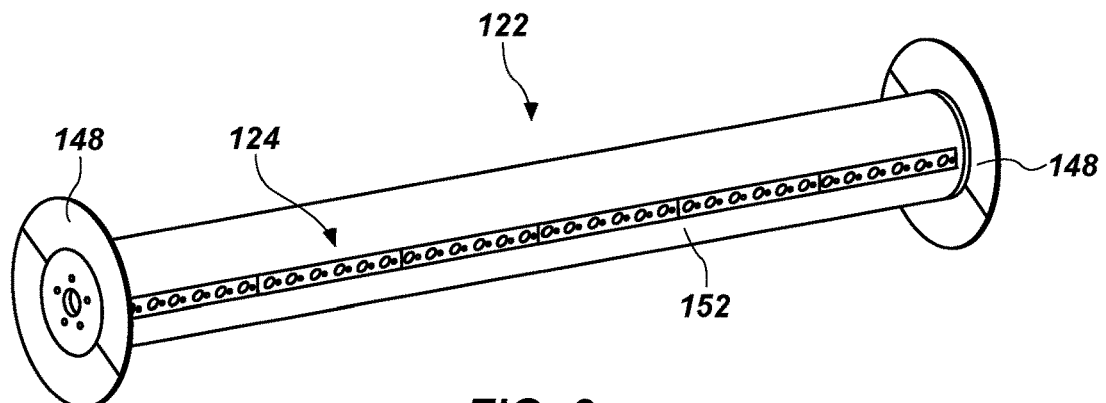
FIG. 3 is a perspective view of an extraction roller of the extractor system of FIG. 1.

Referring to FIG. 3, the extraction roller 122 may include a cylindrical base member 152, although shapes other than cylindrical (e.g., rectangular prismatic, pentagonal prismatic, hexagonal prismatic, I-beam, etc.) are also included in this disclosure. The row of teeth 124 may extend along and protrude from the extraction roller 122. In some embodiments, as shown in FIG. 3, the row of teeth 124 may extend along substantially the entire length of the base member 152, from proximate one of the flanges 148 to proximate the opposing flange 148.

Figure 4:
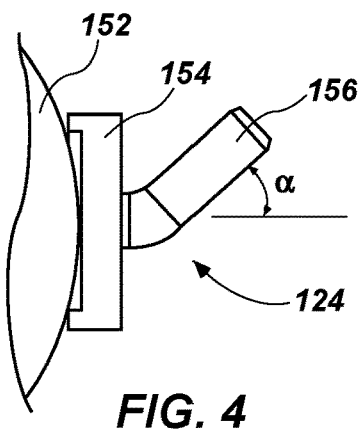
FIG. 4 is a side view of a tooth of the extractor system of FIG. 1.

As shown in FIG. 4, the row of teeth 124 may include a teeth base 154 from which teeth 156 protrude. The teeth base 154 may be coupled (e.g., bolted, adhered, welded) to the base member 152. Each of the teeth 156 may protrude generally at an angle α to normal from the teeth base 154. As shown in FIG. 4, for example, a proximal portion of the teeth 156 may protrude generally normal to the teeth base 154, and a distal portion of the teeth 156 may extend away from the normal at the angle α. The angle α may be in a direction from normal toward an intended direction of rotation of the base member 152 (e.g., upward for counter-clockwise rotation from the perspective of FIG. 4), such as to maintain engagement of the teeth 156 against the article of manufacture during use.

Referring again to FIGS. 1-4, in operation, the trolley 126 may initially be positioned to a lateral side of the first and second platens 102, 104, to avoid interference with vertical movement of the first and second platens 102, 104 toward each other. For example, the trolley 126 may be positioned under a portion of the at least one track 130 that extends beyond a lateral side of the first and second platens 102, 104 (e.g., the back left portion shown in FIG. 1). The first and second platens 102, 104 may then be vertically moved toward each other by moving the first platen 102 downward, by moving the second platen 104 upward, or by moving both the first platen 102 downward and the second platen 104 upward, such as with the linear actuators 108 and/or toggle clamps 110 (and/or with similar linear actuators and toggle clamps operatively connected to the first platen 102). The first platen 102 and/or the second platen 104 may pass between portions of the extractor support frame 132 and/or the at least one track 130.

The first mold half 105A may be positioned against the second mold half 105B to form a mold cavity therebetween. A fluid material may be injected into the mold cavity between the molds 105 using the injection heads 106 to form an article of manufacture. The material within the mold cavity may be cooled to harden the article of manufacture. After sufficient cooling, the article of manufacture may remain flexible (e.g., able to be wrapped about and removed from the extraction roller 122 without any significant damage to the article of manufacture).

The first platen 102 and second platen 104 may be vertically moved to separate from one another (i.e., by vertically moving one or both of the first platen 102 and second platen 104) and to open the mold cavity, leaving the article of manufacture on the second mold half 105B and second platen 104. The article of manufacture may then be removed from the second mold half 105B using the extractor system 120.

The trolley 126 may be horizontally moved (e.g., manually or automatically driven) along the at least one track 130 into a position between the first platen 102 and the second platen 104, over and proximate to an edge portion of the article of manufacture. The edge portion of the article of manufacture may then be positioned to engage the row of teeth 124. In some embodiments, the molds 105 may be designed to form extraction features in article of manufacture, such as cavities that are shaped and positioned to be complimentary to the teeth 156 of the row of teeth 124. In other embodiments, the article of manufacture may not include such extraction features.

The positioning of the article of manufacture to engage the row of teeth 124 may be accomplished manually (e.g., by one or more people lifting and placing the edge portion of the article of manufacture against the row of teeth 124) or automatically (e.g., by moving the extraction roller 122 into a position for the row of teeth 124 to engage the edge portion of the article of manufacture).

The extraction roller 122 may be rotated by the motor 128 to lift the article of manufacture out of the second mold half 105B and to wrap the article of manufacture about the extraction roller 122. At the same time, the trolley 126 may be horizontally moved along the at least one track 130 as the article of manufacture is lifted and wrapped about the extraction roller 122. The horizontal movement of the trolley 126 may be automatically driven by a trolley drive system, automatically driven by resistance to lifting provided by the article of manufacture as the extraction roller 122 is rotated and as the article of manufacture is wrapped about the extraction roller 122, or manually driven by one or more people pushing or pulling on the trolley 126. In some embodiments, a combination of automatic and manual horizontal movement of the trolley 126 along the at least one track 130 may occur.

After the article of manufacture is wrapped about the extraction roller 122 and fully removed from the second mold half 105B, the trolley 126 may be moved into a position laterally adjacent to the first and second platens 102, 104 (e.g., the initial position) and the article of manufacture may be unwrapped and removed from the extraction roller 122 for further processing (e.g., treating, packaging, shipping, quality control review, etc.) and use. The unwrapping and removal of the article of manufacture may be done manually, automatically (e.g., by rotating the extraction roller 122 with the motor 128 in an opposite direction to that used to extract the article of manufacture), or a combination of manually and automatically. The ratchet mechanism 146 may be disengaged to facilitate removal of the article of manufacture from the extraction roller 122.

Figure 5:
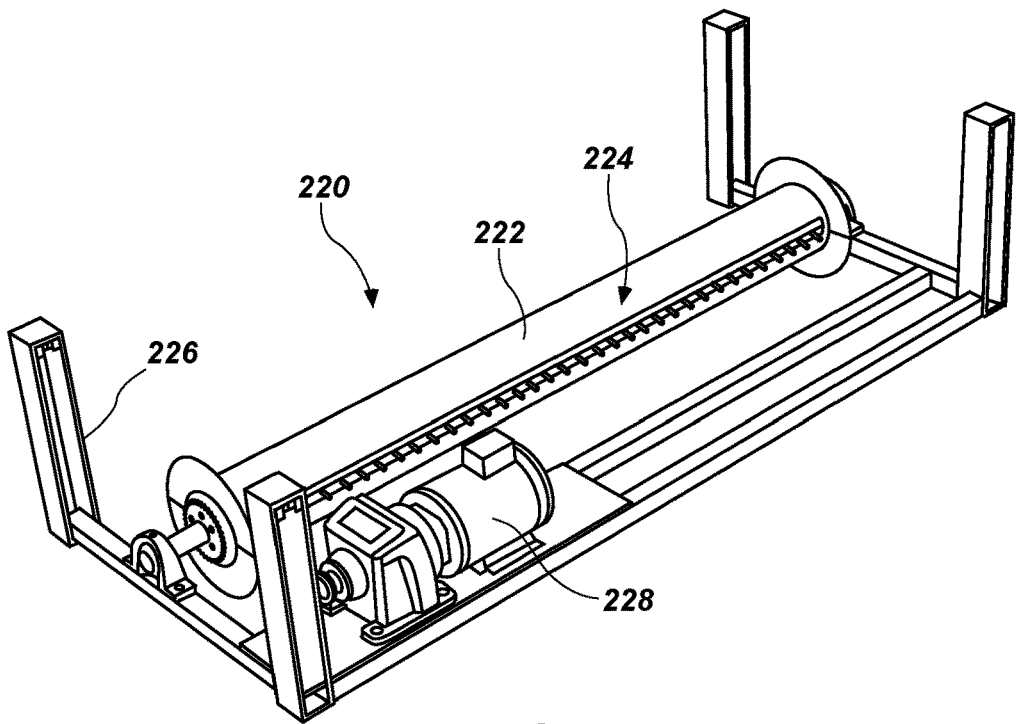
FIG. 5 is a perspective view of an extractor system according to another embodiment of the present disclosure.

Referring to FIG. 5, another embodiment of an extractor system 220 is shown. The extractor system 220 shown in FIG. 5 is similar to the extractor system 120 shown in FIGS. 1-2B and described above. For example, the extractor system 220 shown in FIG. 5 includes an extraction roller 222, a row of teeth 224 extending along and protruding from the extraction roller 222, a motor 228 for driving rotation of the extraction roller 222, and a trolley 226 carrying the extraction roller 222 and motor 228. However, the motor 228 may be positioned to a lateral side of the extraction roller 222, rather than over the extraction roller 222. The motor 228 may be positioned a distance from the extraction roller 222 to leave a sufficient space between the motor 228 and the extraction roller 222 for wrapping an article of manufacture about the extraction roller 222. The extractor system 220 shown in FIG. 5 may have a smaller vertical size, while the extractor system 120 shown in FIGS. 1-2B may have a smaller horizontal size, compared to each other. Accordingly, the particular configuration of the extractor systems 120, 220 may be selected based on various factors, such as distance between the platens 102, 104 (FIG. 1) or the amount of available space next to a molding system 100 (FIG. 1).

Figure 6:
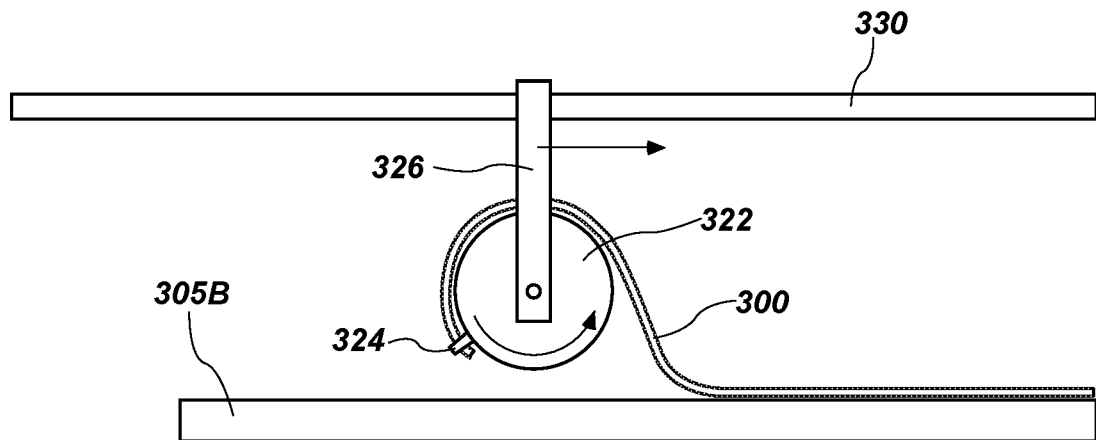
FIG. 6 is a simplified schematic side view of an extractor system in use according to an embodiment of the present disclosure.
Figure 7:
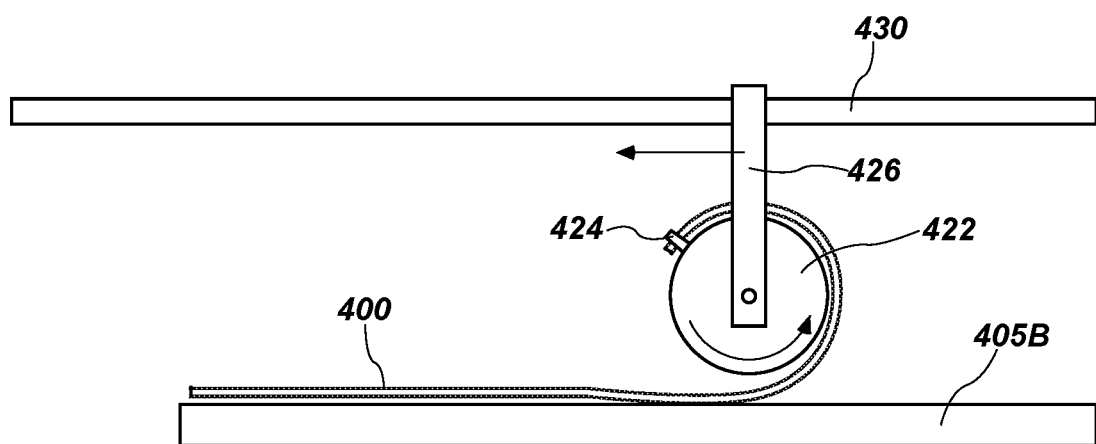
FIG. 7 is a simplified schematic side view of an extractor system in use according to another embodiment of the present disclosure.

FIGS. 6 and 7 illustrate two respective schemes for wrapping an article of manufacture 300, 400 about an extraction roller 322, 422. Referring to FIG. 6, an edge portion of the article of manufacture 300 (e.g., a left edge portion from the perspective of FIG. 6) may be engaged with a row of teeth 324 extending along and protruding from the extraction roller 322, and the extraction roller 322 may be rotated in a direction (e.g., counterclockwise from the perspective shown in FIG. 6) to position the extraction roller 322 between the article of manufacture 300 and a second mold half 305B from which the article of manufacture 300 is to be extracted. A trolley 326 carrying the extraction roller 322 may be moved in a horizontal direction (e.g., to the right from the perspective shown in FIG. 6) along a track 330 to wedge the extraction roller 322 further between the article of manufacture 300 and the second mold half 305B. A similar extraction scheme may be accomplished by engaging an opposite edge portion of the article of manufacture 300 (e.g., a right edge portion from the perspective of FIG. 6) with the row of teeth 324 and rotating the extraction roller 322 in an opposite direction (e.g., clockwise from the perspective shown in FIG. 6) and horizontally moving the trolley 326 in an opposite horizontal direction (e.g., to the left from the perspective shown in FIG. 6). In either case, the extraction roller 322 will be positioned between the article of manufacture 300 and the second mold half 305B.

Referring to FIG. 7, an edge portion of the article of manufacture 400 (e.g., a right edge portion from the perspective of FIG. 7) may be engaged with a row of teeth 424 extending along and protruding from the extraction roller 422, and the extraction roller 422 may be rotated in a direction (e.g., counterclockwise from the perspective of FIG. 7) to position the extraction roller 422 over the article of manufacture 400 (i.e., on an opposite side of the article of manufacture 400 from the second mold half 405B from which the article of manufacture 400 is to be extracted. A trolley 426 carrying the extraction roller 422 may be moved in a horizontal direction (e.g., to the left from the perspective shown in FIG. 7) along a track 430 to roll the extraction roller 422 over the article of manufacture 400. A similar extraction scheme may be accomplished by engaging an opposite edge portion of the article of manufacture 400 (e.g., a left edge portion from the perspective of FIG. 7) with the row of teeth 424 and rotating the extraction roller 422 in an opposite direction (e.g., clockwise from the perspective shown in FIG. 6) and horizontally moving the trolley 426 in an opposite horizontal direction (e.g., to the right from the perspective shown in FIG. 7). In either case, the extraction roller 422 will be positioned between the article of manufacture 400 and the second mold half 405B.

Figure 8:
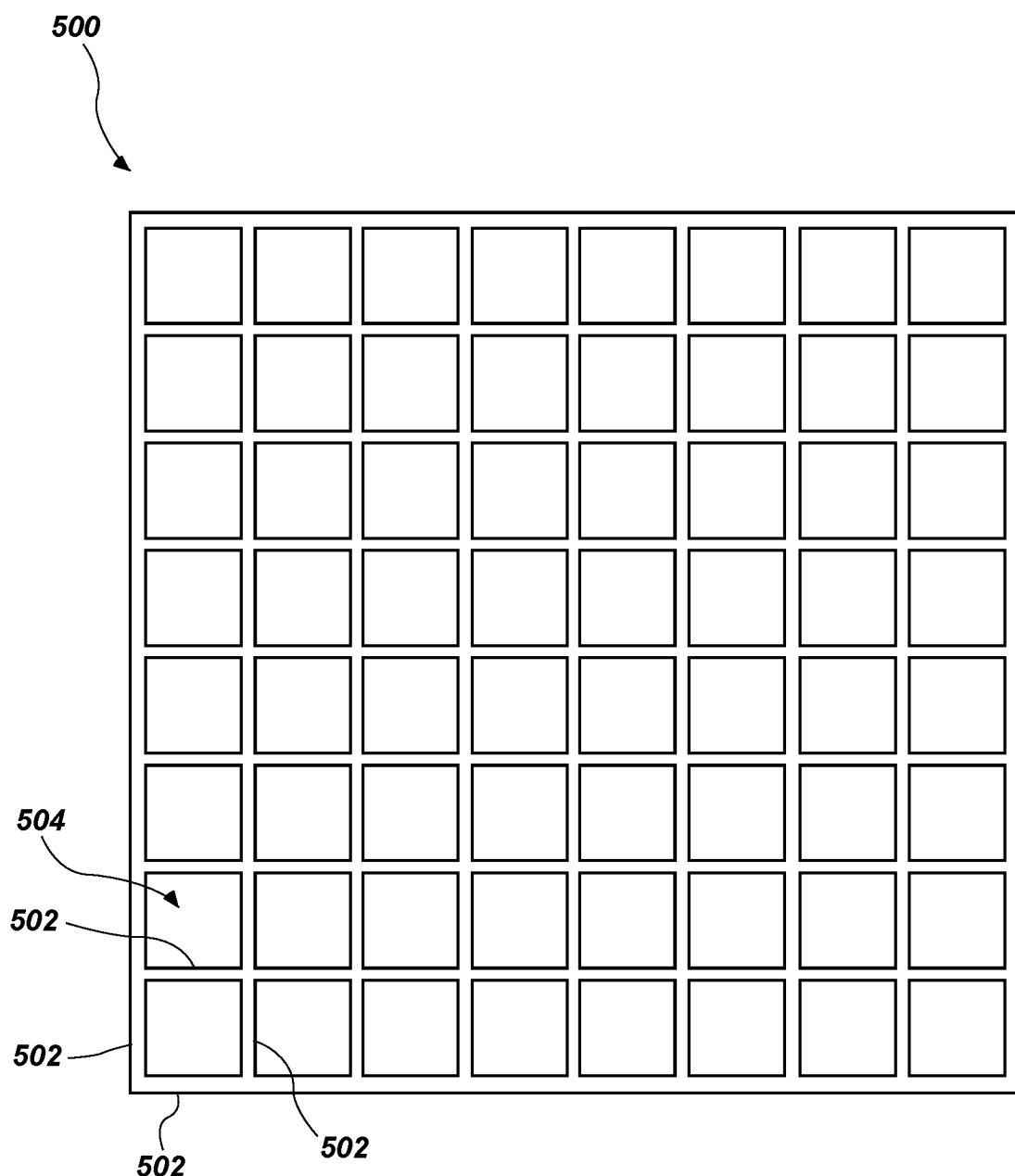
FIG. 8 is a top view of an elastomeric cushioning element according to an embodiment of the present disclosure.

FIG. 8 is a top view of an elastomeric cushioning element 500, such as for use as a mattress covering, according to an embodiment of the present disclosure. Embodiments of the apparatuses and methods shown in FIGS. 1-7 and described above may be useful for manufacturing the elastomeric cushioning element 500. For example, the elastomeric cushioning element 500 may include buckling walls 502 that are interconnected to one another, defining hollow columns 504 (e.g., voids) in an expanded form. As used herein, the term "expanded form" means and includes a state in which the cushioning element 500 has its original size and shape and wherein the buckling walls 502 are separated to define the hollow columns 504. The buckling walls 502 may intersect at right angles to define square hollow columns 504. In additional embodiments, the buckling walls 502 may intersect at other angles to define the hollow columns 504 of other shapes, such as triangles, parallelograms, hexagons, etc. The elastomeric cushioning element 500 may include additional structures and configurations such as those structures and configurations described in, for example: U.S. Pat. No. 8,434,748, titled "Cushions Comprising Gel Springs," issued May 7, 2013; U.S. Pat. No. 8,628,067, titled "Cushions Comprising Core Structures and Related Methods," issued Jan. 14, 2014; U.S. Pat. No. 8,919,750, titled "Cushioning Elements Comprising Buckling Walls and Methods of Forming Such Cushioning Elements," issued Dec. 30, 2014; and U.S. Pat. No. 8,932,692, titled "Cushions Comprising Deformable Members and Related Methods," issued Jan. 13, 2015, the entire disclosures of each of which are incorporated herein by this reference.

The buckling walls 504 may be formed of an elastomeric material. Elastomeric materials are described in, for example: U.S. Pat. No. 5,994,450, titled "Gelatinous Elastomer and Methods of Making and Using the Same and Articles Made Therefrom," issued Nov. 30, 1999; U.S. Pat. No. 7,964,664, titled "Gel with Wide Distribution of MW in Mid-Block" issued Jun. 21, 2011; U.S. Pat. No. 4,369,284, titled "Thermoplastic Elastomer Gelatinous Compositions" issued Jan. 18, 1983; U.S. Pat. No. 8,919,750, titled "Cushioning Elements Comprising Buckling Walls and Methods of Forming Such Cushioning Elements," issued Dec. 30, 2014; the entire disclosures of each of which are incorporated herein by this reference. The elastomeric material may include an elastomeric polymer and a plasticizer. The elastomeric material may be a gelatinous elastomer (also referred to in the art as gel, elastomer gel, or elastomeric gel), a thermoplastic elastomer, a natural rubber, a synthetic elastomer, a blend of natural and synthetic elastomers, etc., and may include one or more fillers, antioxidants, resins, pigments, etc.

The extractor systems 120, 220 described above may be sized, shaped, and configured for use with elastomeric cushioning elements, such as the elastomeric cushioning element 500. For example, the rows of teeth 124, 224, 324, 424 may be spaced and sized to fit within at least some of the hollow columns 504 along an edge of the elastomeric cushioning element 500 and to physically interact with the buckling walls 502, to effectively pull the elastomeric cushioning element 500 out of the mold 105 and to wrap the elastomeric cushioning element 500 about the extraction rollers 122, 222, 322, 422, as described above.

Additional non-limiting example embodiments of the present disclosure are set forth below.

Embodiment 1

An extractor system for extracting a flexible article of manufacture from a mold, the extractor system comprising: an extraction roller, comprising: a base member; and a row of teeth extending along and protruding from the base member; at least one track configured to support the extraction roller; a trolley configured to carry the extraction roller from a first side of the mold toward a second, opposite side of the mold along the at least one track; and a motor mounted on the trolley and configured to rotate the extraction roller relative to the trolley as the trolley carries the extraction roller from the first side of the mold toward the second, opposite side of the mold.

Embodiment 2

The extractor system of Embodiment 1, further comprising a motor mounted on the trolley and configured to rotate the extraction roller relative to the trolley as the trolley carries the extraction roller from the first side of the mold toward the second, opposite side of the mold.

Embodiment 3

The extractor system of Embodiment 2, wherein the elongated drive member is a chain.

Embodiment 4

The extractor system of any of Embodiments 1 through 3, wherein the base member of the extraction roller is cylindrical in shape.

Embodiment 5

The extractor system of any of Embodiments 1 through 4, wherein the row of teeth of the extraction roller comprises a plurality of teeth protruding from a teeth base at an angle to normal from the teeth base.

Embodiment 6

The extractor system of Embodiment 5, wherein the angle to normal is in a direction toward an intended direction of rotation of the extraction roller when the extraction roller is used to wrap an article of manufacture about the extraction roller.

Embodiment 7

The extractor system of any of Embodiments 1 through 6, wherein the motor is mounted on the trolley vertically above the extraction roller.

Embodiment 8

The extractor system of any of Embodiments 1 through 6, wherein the motor is mounted on the trolley horizontally adjacent to the extraction roller.

Embodiment 9

The extractor system of any of Embodiments 1 through 8, wherein the at least one track comprises two tracks.

Embodiment 10

A molding system, comprising: a mold including a first mold half carried by a first platen and a second mold half carried by a second platen, the first mold half and the second mold half defining a mold cavity therebetween for forming a flexible article of manufacture; and an extractor system for extracting the flexible article of manufacture from the mold, the extractor system comprising: an extraction roller sized and configured for wrapping the flexible article of manufacture about the extraction roller; and a trolley carrying the extraction roller and configured for horizontal movement of the extraction roller between the first platen and the second platen.

Embodiment 11

The molding system of Embodiment 10, wherein the extractor system further comprises at least one track, wherein the trolley is horizontally movably coupled to the track.

Embodiment 12

The molding system of Embodiment 11, wherein the at least one track extends beyond a lateral side of the mold.

Embodiment 13

The molding system of Embodiment 11 or Embodiment 12, wherein the at least one track comprises two tracks separated from each other a sufficient distance to allow at least one of the first mold half or the second mold half to pass vertically between the two tracks.

Embodiment 14

The molding system of any of Embodiments 10 through 13, wherein extraction roller and motor are sized and configured to fit directly between the first mold half and the second mold half when the first mold half and second mold half are separated from each other.

Embodiment 15

A method of extracting a flexible article of manufacture from a mold, the method comprising: separating a first platen from a second platen of the mold after molding the flexible article of manufacture between the first platen and the second platen; positioning an extraction roller between the separated first platen and second platen; engaging the flexible article of manufacture with a row of teeth positioned along the extraction roller; and rotating the extraction roller while horizontally moving the extraction roller over the first platen to wrap the flexible article of manufacture about the extraction roller.

Embodiment 16

The method of Embodiment 15, wherein engaging the flexible article of manufacture with the row of teeth comprises manually positioning the flexible article of manufacture against the row of teeth.

Embodiment 17

The method of Embodiment 15, wherein engaging the flexible article of manufacture with the row of teeth comprises automatically positioning the flexible article of manufacture against the row of teeth.

Embodiment 18

The method of any of Embodiments 15 through 17, wherein rotating the extraction roller comprises automatically rotating the extraction roller with a motor operatively coupled to the extraction roller.

Embodiment 19

The method of any of Embodiments 15 through 18, further comprising positioning the extraction roller between an edge portion of the flexible article of manufacture and the first platen.

Embodiment 20

The method of any of Embodiments 15 through 18, further comprising positioning the extraction roller over the flexible article of manufacture on an opposite side thereof from the first platen.

The embodiments of the disclosure described above and illustrated in the accompanying drawing figures do not limit the scope of the invention, since these embodiments are merely examples of embodiments of the disclosure. The invention is encompassed by the appended claims and their legal equivalents. Any equivalent embodiments lie within the scope of this disclosure. Indeed, various modifications of the present disclosure, in addition to those shown and described herein, such as other combinations and modifications of the described elements, will become apparent to those of ordinary skill in the art from the description. Such embodiments, combinations, and modifications also fall within the scope of the appended claims and their legal equivalents.

What is claimed:

1. A method for removing a flexible article of manufacture from a mold, comprising:
   positioning an extraction roller adjacent to the flexible article of manufacture;
   positioning at least an edge portion of the flexible article of manufacture on an exterior surface of the extraction roller; and
   while maintaining contact between the edge portion and the exterior surface of the extraction roller, rolling the extraction roller to concurrently pull the flexible article of manufacture from at least a portion of a mold and completely wrap the flexible article of manufacture onto the extraction roller.

2. The method of claim 1, wherein positioning at least a portion of the flexible article of manufacture on the extraction roller comprises grasping the edge portion of the flexible article of manufacture with the extraction roller.

3. The method of claim 1, comprising moving the extraction roller over at least the portion of the mold while concurrently pulling the flexible article of manufacture from at least the portion of the mold and rolling the flexible article of manufacture to completely wrap the flexible article of manufacture onto the extraction roller.

4. The method of claim 3, comprising moving the extraction roller between at least the portion of the mold and another portion of the mold that has been separated from at least the portion of the mold.

* * * * *